United States Patent
Manepalli et al.

(10) Patent No.: US 9,883,546 B2
(45) Date of Patent: Jan. 30, 2018

(54) POSTPONING A RESENDING OF A DATA SERVICE REQUEST

(71) Applicant: Apple Inc., Cupertino, CA (US)

(72) Inventors: Venkateswara Rao Manepalli, Sunnyvale, CA (US); Madhusudan Chaudhary, Campbell, CA (US); Prashant H. Vashi, Sunnyvale, CA (US); Raghuveer Mallikarjunan, Sunnyvale, CA (US); Srinivasan Nimmala, San Jose, CA (US); Anil G. Naik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 14/845,876

(22) Filed: Sep. 4, 2015

(65) Prior Publication Data

US 2017/0070928 A1 Mar. 9, 2017

(51) Int. Cl.
*H04W 76/02* (2009.01)
*H04W 48/20* (2009.01)

(52) U.S. Cl.
CPC ......... *H04W 76/027* (2013.01); *H04W 48/20* (2013.01)

(58) Field of Classification Search
CPC ..................... H04W 76/027; H04W 48/20
See application file for complete search history.

(56) References Cited

U.S. PATENT DOCUMENTS

| 7,733,830 | B2 | 6/2010 | Curcio et al. | |
| 7,822,065 | B2* | 10/2010 | Lu | H04W 88/02 370/328 |
| 9,055,495 | B2 | 6/2015 | Nukala et al. | |
| 2009/0232097 | A1* | 9/2009 | Taneja | H04W 36/02 370/331 |
| 2010/0178918 | A1 | 7/2010 | Chandrasekaran | |
| 2014/0269275 | A1* | 9/2014 | Jun | H04W 36/22 370/230 |
| 2015/0257057 | A1* | 9/2015 | Su | H04W 56/0015 370/329 |
| 2016/0330604 | A1* | 11/2016 | Kim | H04W 74/00 |

FOREIGN PATENT DOCUMENTS

CN 100571439 C 12/2009

\* cited by examiner

*Primary Examiner* — Omar Ghowrwal
(74) *Attorney, Agent, or Firm* — Meyertons Hood Kivlin Kowert & Goetzel, P.C.; Jeffrey C. Hood; Brian E. Moore

(57) ABSTRACT

Apparatuses, systems, and methods for user equipment (UE) devices to perform a postponement of a data service request are described. A UE may detect a data service request failure during cell reselection and postpone a resend of the data service request based on a status of the cell reselection. The status may be an indication that the UE is attempting to camp on a cell or that the UE is monitoring one or more metrics associated with cell reselection. To postpone the data service request, the UE may postpone the data service request for a specified period of time or until the cell reselection is complete. The status may be monitored on a first layer of a protocol stack and the data service request may generated by a second layer of the protocol stack. The postponement may be for a fixed or variable time period.

20 Claims, 8 Drawing Sheets

POSTPONING A RESENDING OF A DATA SERVICE REQUEST

FIELD

The present application relates to wireless devices, and more particularly to an apparatus, system, and method for wireless devices to enhance data retry performance in a cellular network.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may use a search algorithm to acquire and/or re-acquire service with a wireless network. These search algorithms may burden device resources. Thus, improvements in the field are desired.

SUMMARY

Embodiments are presented herein of methods for wireless devices to more efficiently scan frequency bands for potential base stations and of devices configured to implement these methods. Embodiments relate to a user equipment (UE) device having at least one antenna for performing wireless communications, a radio, and a processing element coupled to the radio. The UE may perform voice and/or data communications, as well as the methods described herein.

According to the techniques described herein, a UE may detect a data service request failure during cell reselection and postpone a resend of the data service request based on a status of the cell reselection. The status may be an indication that the UE is attempting to camp on a cell or that the UE is monitoring one or more metrics associated with cell reselection. To postpone the data service request, the UE may postpone the data service request for a specified period of time or until the cell reselection is complete.

According to some embodiments, an apparatus may include a processing element that may be configured to monitor first information associated with cell reselection on a first layer of a protocol stack, share the first information with a second layer of the protocol stack, and postpone, based at least in part on the first information, a data service request generated by the second layer of the protocol stack. The apparatus may be included in a baseband processor of a user equipment device. The service request may be postponed for a fixed or variable period of time.

In some embodiments, a non-transitory computer accessible memory medium may include program instructions which, when executed at a wireless user equipment (UE) device, may cause the UE to monitor a status of a cell reselection, determine failure of a data service request, and postpone, based on the status, a reattempt of the data service request. The data service request may be postponed for a fixed or variable period of time.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
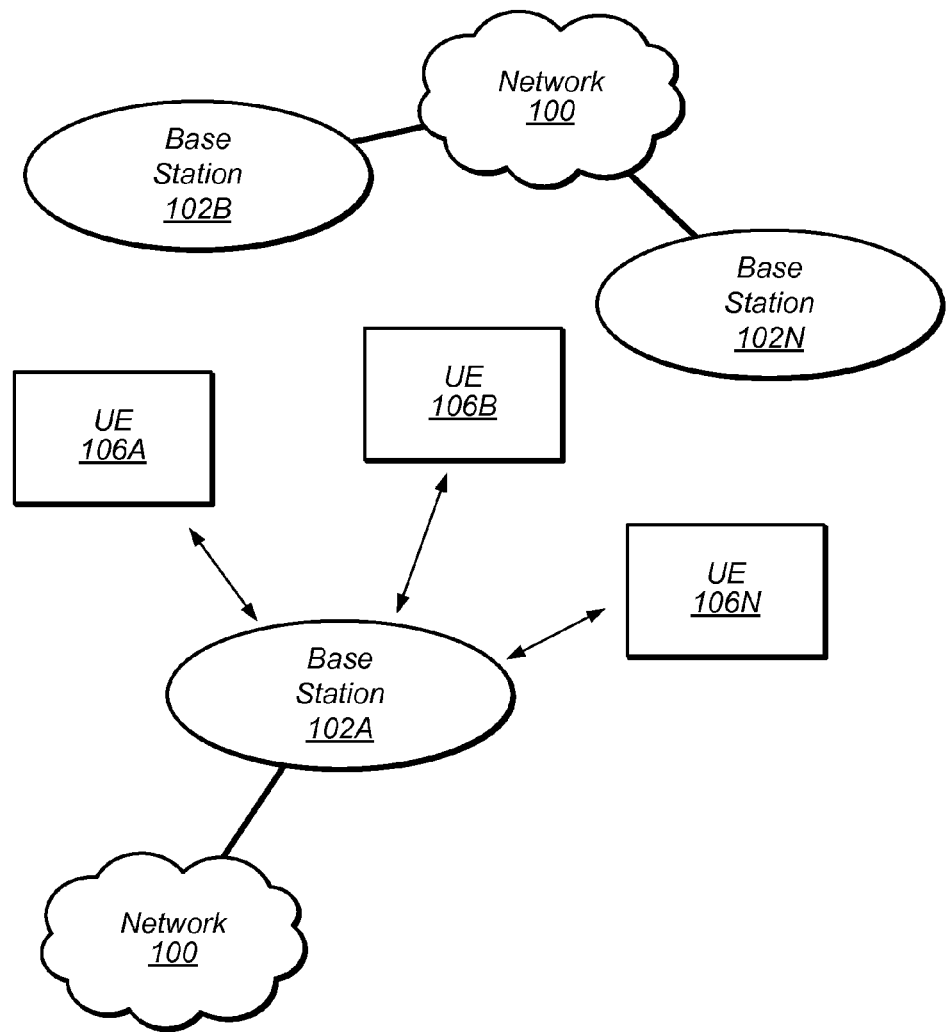
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while BLUETOOTH channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112(f) interpretation for that component.

Figure 2:
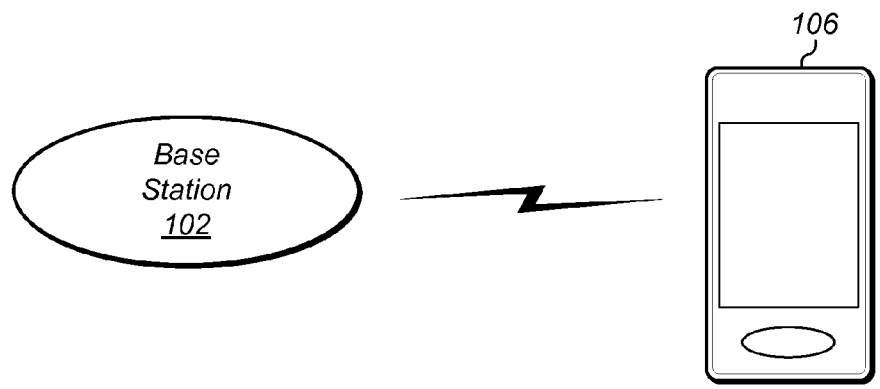
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., WI-FI) and/or peer-to-peer wireless communication protocol (e.g., BLUETOOTH, WI-FI peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of WI-FI and BLUETOOTH. Other configurations are also possible.

Figure 3:
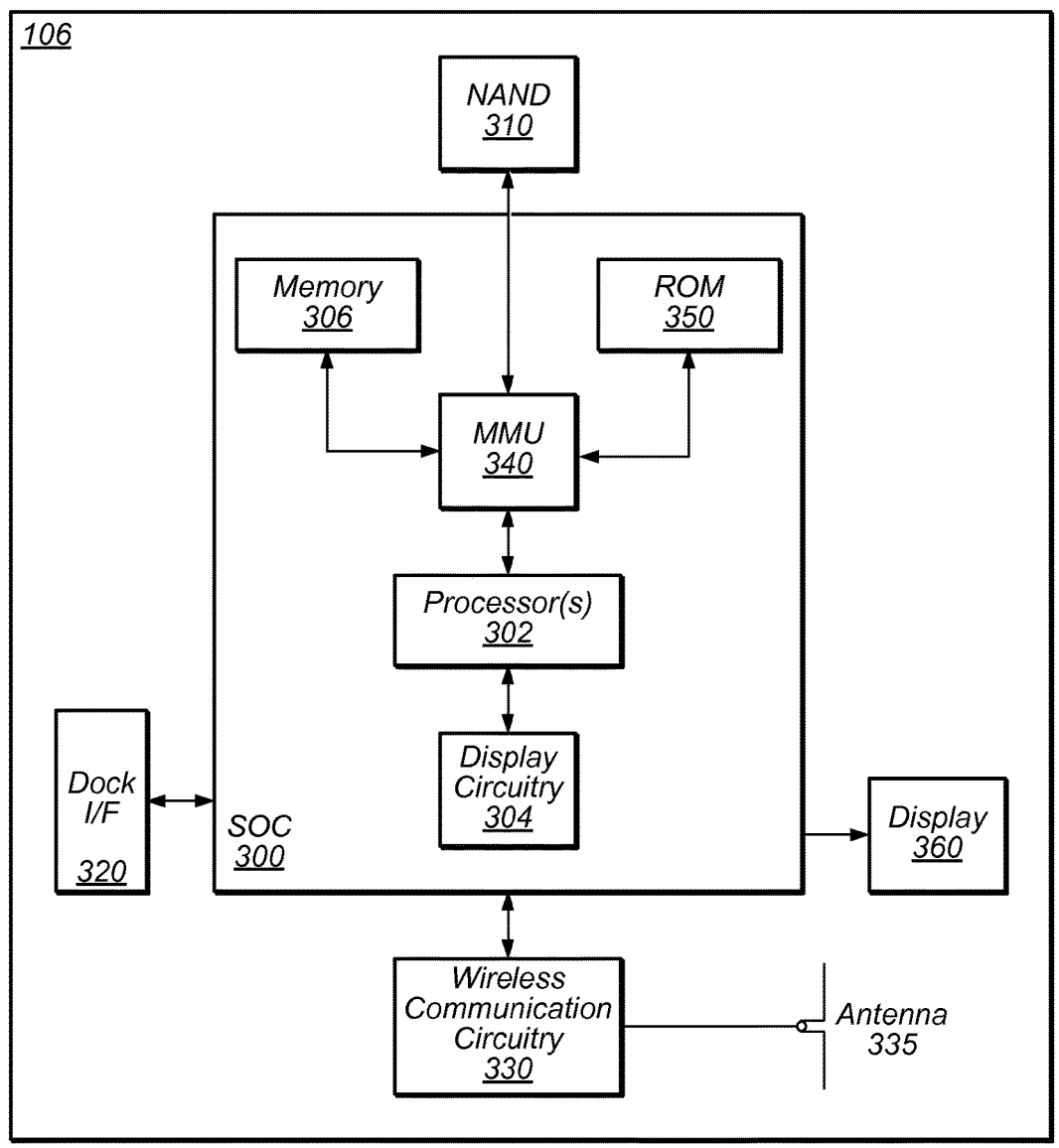
FIG. 3 illustrates an example block diagram of a UE according to some embodiments.

FIG. 3—Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, BLUETOOTH, WI-FI, GPS, etc.).

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 340, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor 302.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
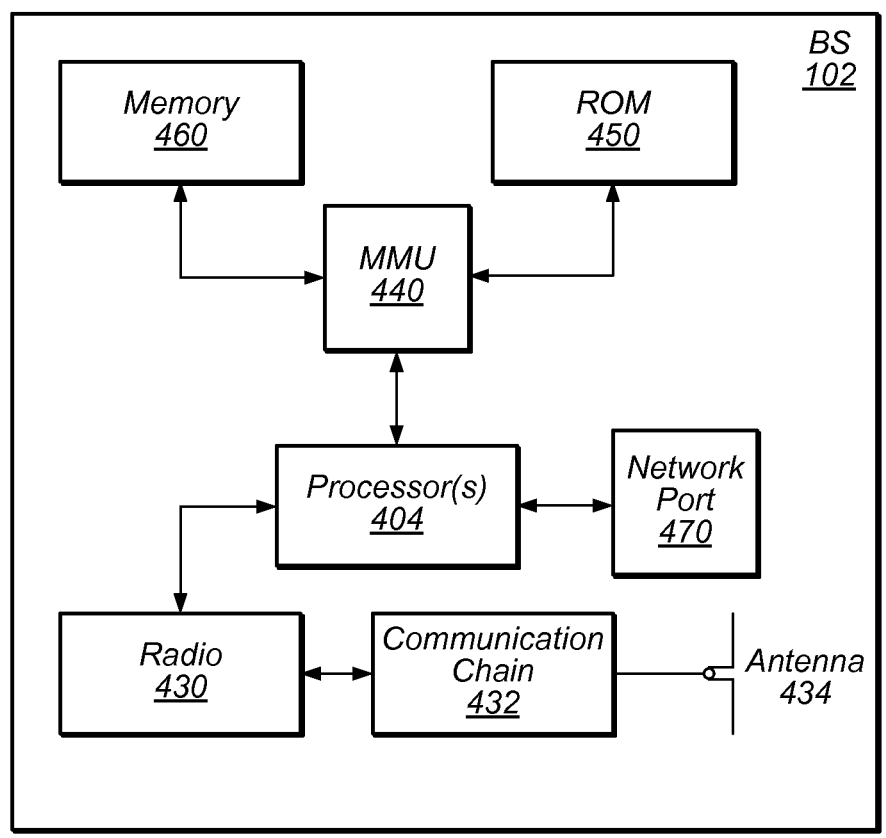
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, WI-FI, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a WI-FI radio for performing communication according to WI-FI. In such a case, the base station 102 may be capable of operating as both an LTE base station and a WI-FI access point. As another possibility, the base station 102 may include a multi-mode radio which is capable of performing communications according to any of multiple wireless communication technologies (e.g., LTE and WI-FI, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Requesting a Data Connection

In some existing implementations, a user equipment device (UE) may implement communication with a network on multiple layers of a protocol stack. For example, a lower layer (e.g., a MAC layer or one or more physical layers), a radio resource control (RRC) layer, and an upper layer (e.g., a data service layer). In some scenarios, a UE may request a data connection via one or more upper layers via a service request (SR) initiated from the UE to the network (e.g., a base station of the network). However, the SR may fail for various reasons such as a random access control channel (RACH) failure, network congestion, and/or weak signal conditions (channel quality). In such instances of failure, lower layers, such as data modules in a cellular modem (e.g., radio) of the UE may resend, or reattempt the SR in order to give data service to the upper layer requesting the data connection. However, multiple attempts to resend, or reattempt, the SR may lead to congestion in the network and/or additional power consumption in the UE.

Hence, in some existing implementations, the UE may employ (or use) mitigation techniques such as back off, retry, and/or throttling algorithms. These techniques may be as simple as the UE delaying sending (or resending) the SR. The delay may range from milliseconds to minutes. In addition, techniques may be specific to a particular RAT (Radio Access Technology) or PLMN. Further, the UE may maintain a count of resends of the SR and the UE may leave a particular RAT and/or PLMN if the count exceeds a maximum threshold. In such instances, the UE may attempt to camp on (or connect to) another available RAT and/or PLMN. Such attempts may affect user experience as the UE may connect to a RAT that provides lower speeds as compared to the prior RAT, e.g., the UE may connect to 3G CDMA cell if the UE has exceed a maximum threshold on an LTE cell.

Figure 5A:
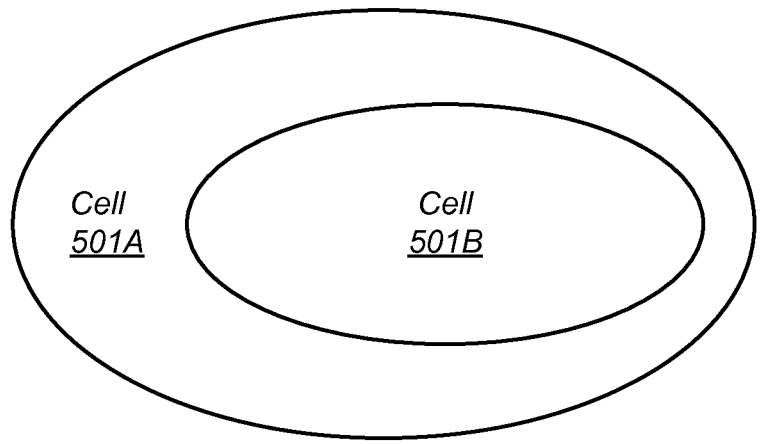
FIGS. 5A-5B illustrate various manners in which cellular systems may be deployed, according to the prior art.
Figure 5B:
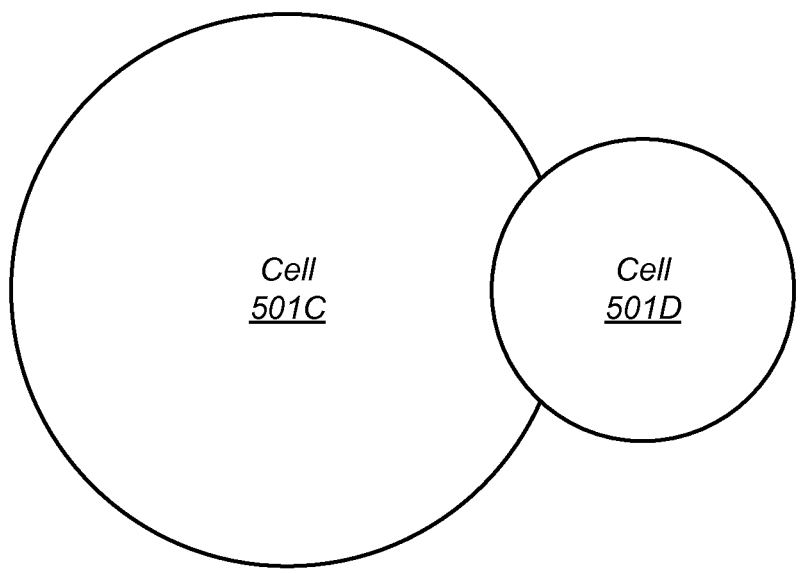

In addition, as illustrated in FIGS. 5A and 5B, cellular systems may be deployed in various manners. For example, as shown in FIG. 5A, cells may be deployed as overlapping cells. In some implementations, cell 501A may operate according to a first frequency and cell 501B may operate according to a second frequency. In other implementations, cell 501A and 501B may operate according to a third frequency (which may different than the first and second frequencies or may be the same as the first or second frequency). In other words, cells 501A and 501B may operate according to the same frequency or may operate according to different frequencies. FIG. 5B illustrates another deployment example in which cells 501C and 501D are deployed as adjacent cells. Note that in some implementations, cell 501C may operate according to a first frequency and cell 501D may operate according to a second frequency. In other implementations, cells 501C and 501D may operate according to a third frequency (which may different than the first and second frequencies or may be the same as the first or second frequency). In other words, cells 501C and 501D may operate according to the same frequency or may operate according to different frequencies.

In some implementations, a particular deployment style (e.g., adjacent or overlapping, differing or common frequencies) may be based on coverage or capacity. For example, cells intended for coverage are generally larger (in terms of coverage area) than cells intended for capacity, e.g., as illustrated in FIG. 5A, cell 501A may be intended for coverage (e.g., a coverage cell) whereas cell 501B may be intended for capacity (e.g., a capacity cell). In some implementations, when cells are deployed for capacity in an overlapping fashion (e.g., FIG. 5A), a capacity cell (e.g., cell 501B) may have a higher reselection priority than that of a coverage cell (e.g., cell 501A). In other words, when a UE is in an overlapping coverage area, the UE will prefer the capacity cell over the coverage cell. In addition to reselection priority for the capacity cell, other reselection parameters may also be configured such that most of UEs camped on the coverage cell will move to the capacity cell as the UEs come into range of the capacity cell.

Similarly, as illustrated in FIG. 5B, cell 501C may be intended for coverage (e.g., a coverage cell) whereas cell 501D may be intended for capacity (e.g., a capacity cell). Thus, as described above, the capacity cell may have a higher reselection priority than that of the coverage cell. Additionally, reselection parameters may also be configured such that most of UEs camped on the coverage cell will move to the capacity cell as the UEs come into range of the capacity cell.

Thus, in some scenarios, the reselection parameters between the capacity and coverage cells may result in frequent reselections between the cells for UEs which are at an edge of the capacity cell. Further, in some scenarios, a data service (e.g., an SR or multiple SRs) may be initiated on higher layers as described above when a UE is in the process of performing a reselection and/or in the process of performing measurements to perform reselection on lower layers. Additionally, since the SRs (i.e., establishment of a data connection or data connections) are prioritized over the reselection, the SRs initiated during this period of reselection may delay the ongoing reselection or measurements to perform reselection. As described above, failure of the SRs on the higher layers (e.g., due to RACH failures or network congestion, among other causes) may trigger back off, throttling, and/or retry procedures, that coupled with the ongoing reselection due to cell edge behavior between coverage and capacity cells on the lower layers, may result in the UE attempting to camp on another RAT and/or PLMN within range, e.g., a 3G CDMA cell when an LTE cell is within range.

Data Connection Retry

Embodiments described herein provide systems and methods for performing and/or completing cell reselection during a data connection retry. In some embodiments, lower layers of a UE, such as UE 106, may monitor status of cell reselection, e.g., the UE may monitor the status of the cell reselection and/or the status of measurement associated with cell reselection. In some embodiments, lower layers (e.g., medium access control (MAC) and/or physical layer (PHYS)) of a protocol stack implemented on a processing element of the UE may indicate the status to upper layers (e.g., data services (DS)) of the protocol stack. In other words, a baseband processor of a radio of a UE may monitor or track status of a lower layer of a protocol stack and indicate the monitored or tracked status to an upper layer of the protocol stack. In addition, the monitored or tracked status may be sent (or shared) from the lower layers to an intermediate layer (e.g., radio resource control (RRC) layer) prior to being sent to (or shared with) the upper layer. According to some embodiments, the status may be based at least in part on an idle discontinuous reception (DRX) cycle. Additionally, the status may include information such as signal quality, reselection measurement status, and metrics regarding neighboring cells.

For example, according to some embodiments, the status may indicate any one or combinations of $S_{criteria}$ status (e.g., an indication of a signal quality of neighboring cells (i.e., cells within a signaling range of the UE)), reselection measurement status (e.g., for inter-frequency, intra-frequency, and inter-RAT reselection), $T_{resel}$ status for neighboring cells including a value of $T_{resel}$ and/or a time remaining of a timer, reference signal received quality (RSRQ) status, reference signal received power (RSRP) status, signal to interference and noise ratio (SINR) status, RACH failure status, and/or page decode failure status. In some embodiments, if $S_{criteria}$ is less than a threshold, lower layers may initiate (i.e., begin performing) reselection related measurements. In addition, if $S_{criteria}$ is below the threshold for a specified number of times in contiguous idle DRX cycles, the lower layers may perform reselection. In some embodiments, $T_{resel}$ may indicate a timer and the timer may be started when a neighboring cell satisfies one or more cell reselection criteria. Note that if a neighboring cell continuously satisfies the reselection criteria for a specified duration of time, lower layers of the UE may initiate a connection with the neighboring cell will camp on the new cell. Note that in various embodiments that the status may be based at least in part on a comparison of a value (e.g., RSRQ, RSRP, SINR, RACH failure status, and so forth) to an associated threshold. For example, RACH failure status may be based in part on a comparison of a number of RACH failures over a time period to an associated threshold. As another example, page decode failure status may be based in part on a comparison of a number of page decode failures over a period of time to an associated threshold.

In some embodiments, the UE (e.g., the upper layers of the protocol stack) may use the status (e.g., the status received from the lower layers of the protocol stack) to determine whether to delay a service request (SR). For example, if the UE (e.g., the upper layers of the protocol stack) is in a throttling phase and performing SR retries, the UE may use the status to determine to delay the SR retry. The delay may be in multiples of seconds. The delay of the SR retry may allow the lower layers to complete reselection measurements and/or reselection uninterrupted. In some embodiments, the delay may allow the UE to complete a connection attempt prior to another SR retry being attempted. In some embodiments, the delay may also allow the SR to be completed prior to a maximum number of SR retries being attempted and may allow the UE to avoid falling back to a slower RAT.

In some embodiments, the delay may be specified. In other embodiments, the delay may be dynamic (or variable). In some embodiments, a delay timer may be configured and started upon notification from the lower layers. In some embodiments, the lower layers may notify the upper layers of a successful connection or reselection and the delay timer may be interrupted in response and the SR may be retried.

In some embodiments, if a number of SR retries exceeds a retry threshold, the UE may scan for available neighbor cells prior to initiating a throttling algorithm and moving to a different RAT/PLMN. In some embodiments, the UE may scan for available LTE neighbor cells and attempt to camp on a neighboring LTE cell prior to initiating the throttling algorithm and falling back to another RAT/PLMN such as 3G CDMA. The UE may base the scan on system information blocks (SIBs) or on all bands the UE supports for a particular PLMN. According to some embodiments, if the number of SR retries exceeds the retry threshold, the UE may block a specific band, frequency, and/or cell in a PLMN/RAT and repeat cell reselection for other bands, frequencies, and/or cells within range prior to falling back or attempting to reselect to a different PLMN/RAT. In other words, the UE may attempt all band, frequency, and cell combinations for a current PLMN/RAT prior to attempting to reselect to a new PLMN/RAT.

In some embodiments, a reselection timer, such as $T_{resel}$, for a particular neighboring cell may be running when the UE receives a data connection request (e.g., a higher layer of the protocol stack may initiate an SR) and the UE may not abort (or interrupt) the reselection timer in order to allow the particular neighboring cell to satisfy reselection criteria over a duration of the reselection timer. In other words, the data connection request may be attempted while the reselection timer is running and not aborting (or interrupting) the reselection timer may allow the particular neighboring cell to qualify for reselection based on satisfying reselection criteria (e.g., maintaining a signal quality above a signal quality threshold for the duration of the reselection timer). Thus, if the data connection request fails, the UE may reselect to the particular neighboring cell prior to reattempting the data connection request. In other embodiments, if the reselection timer for the particular neighboring cell is running when the UE receives the data connection request, the UE may abort (or interrupt) the reselection timer and immediately attempt to reselect to the particular neighboring cell such that the data connection request will be attempted once the UE is camped on the particular neighboring cell. In some embodiments, if the UE is in idle mode and detects RACH failures due to poor signal conditions (channel quality), the UE may reselect to an identified neighboring cell with better signal conditions (channel quality) prior to further RACH attempts without the reselection timer expiring. In such embodiments, the UE may continue the data connection request once the UE is camped on the identified neighboring cell.

Figure 6:
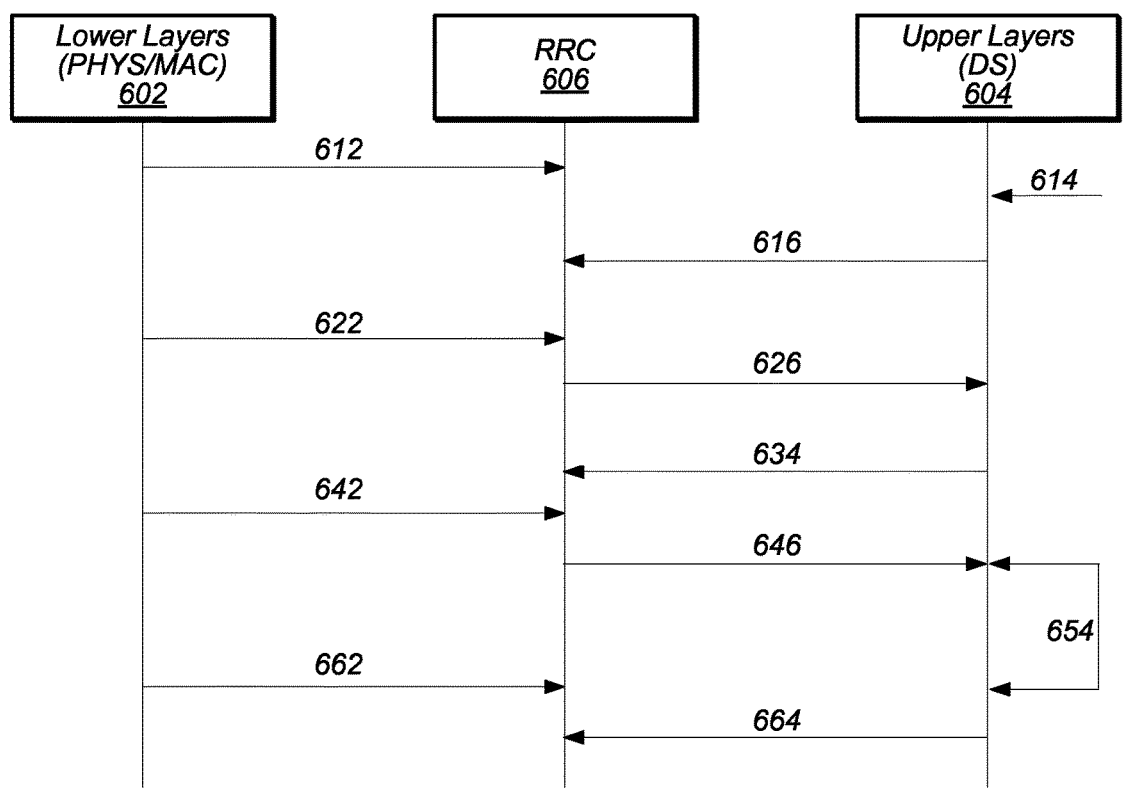
FIG. 6 illustrates signaling flow between layers of a protocol stack implemented on a processing element of a UE, according to some embodiments.

FIG. 6—Signaling Diagram

FIG. 6 illustrates signaling flow between layers of a protocol stack implemented on a processing element of a UE (such as UE 106), according to some embodiments. The signaling flow illustrated in FIG. 6 may be used in conjunction with any of the systems or devices shown in the above Figures, among other devices. In various embodiments, some of the signals shown may be performed concurrently, in a different order than shown, or may be omitted. Additional signals may also be performed as desired. As shown, the signaling flow may operate as follows.

At 612, lower layers 602 (e.g., a MAC or physical layer of a protocol stack implemented on a processing element of a UE) may send reselection status information to radio resource control layer (RRC) 606. The reselection status information may include any one or combination of various metrics such as reselection status for each neighboring cell, reselection measurement status (e.g., for inter-frequency, intra-frequency, and inter-RAT reselection), reselection timer status for each neighboring cell (e.g., started, failed, passed), a value and/or a time remaining of the reselection timer for each neighboring cell, RSRQ status, RSRP status, SINR status for each neighboring cell, RACH failure status for a cell the UE is currently camped on, and/or page decode failure status for the cell the UE is currently camped on. Additionally, lower layers 602 may send updates of the reselection status information periodically at 622, 642, and 662. Note that the periodicity of the updates may be based on a paging cycle of the UE (or network).

Note that in some embodiments, the reselection status (e.g., $S_{criteria}$) for a serving cell (e.g., a cell the UE is camped on) may be compared to a reselection threshold and if the reselection status is below the threshold, lower layers 602 may initiate (i.e., begin performing) reselection related measurements on a neighboring cell or cells. For example, reselection status may be an indication of a signal quality of each neighboring cell. In addition, if the reselection status is below the reselection threshold for a specified number of times for a contiguous number of idle cycles, lower layers 602 may perform reselection to camp on the particular neighboring cell.

Further, in some embodiments, the reselection timer may be initiated when a neighboring cell satisfies one or more cell reselection criteria. Note that if the particular neighboring cell continuously satisfies the reselection criteria for a specified duration of time, lower layers 602 of the UE may camp on the particular neighboring cell. Note that in various embodiments that the status may be based at least in part on a comparison of a value (e.g., RSRQ, RSRP, SINR, RACH failure status, and so forth) to an associated threshold.

At 614, upper layers 604 may receive a data connection request. For example, upper layers 604 may receive a data access request from an application layer of the UE.

At 616, upper layers 604 may send the data connection request to RRC 606. In some embodiments, the data connection request may be a service request.

At 626, RRC 606 may send an indication to upper layers 604 that the data connection request failed. For example, RRC 606 may send an indication to upper layers 604 that a service request failed.

At 634, upper layers 604 may send an instruction to RRC 606 to check lower layer status.

At 646, RRC 606 may send a status indication to upper layers 604 base at least in part on reselection status information sent from lower layers 602 to RRC 606 (e.g., status information sent at 612, 622, and/or 642). The status information may indicate that lower layers 602 is performing a reselection measurement or procedure.

At 654, upper layers 604 may delay a reattempt of the data connection based at least in part on the status indication. The delay may be a static delay or a variable delay. In other words, upper layers 604 may delay the reattempt of the data connection for a specified period of time (e.g., upper layers 604 may set a timer and wait for the timer to expire before reattempt) or upper layers 604 may postpone the reattempt of the data connection until an indication from lower layers 602 is received indicating the reselection measurement or procedure is completed (e.g., the UE has reselected to a new cell and/or signal conditions (channel quality) on a current cell have improved). In addition, in some embodiments, if upper layers 604 receive an indication of poor channel quality and/or weak channel conditions, the upper layers may increase a threshold value to allow more SR attempts prior to exceeding the threshold.

At 664, upper layers 604 may reattempt the data connection.

In some embodiments, a number of data connection reattempts may be tracked (e.g., by the processing element of the UE). Further, the number of data connection reattempts may be compared to a reattempt threshold and if the number of reattempts exceeds the reattempt threshold, a scan for available neighbor cells may be initiated prior to an attempt to reselect to a different cell. In some embodiments, the scan may be for available LTE neighbor cells and reselection to an available neighboring LTE cell may be attempted prior to initiating a fall back reselection to a lesser (or slower) RAT such as 3G CDMA. In some embodiments the scan may be based on system information blocks (SIBs) or on all bands supported for a particular PLMN. According to some embodiments, if the number of data connection reattempts exceeds the reattempt threshold, a specific band, frequency, and/or cell in a PLMN/RAT may be blocked (e.g., removed from a list of available cells) and cell reselection may be repeated for other bands, frequencies, and/or cells within range prior to falling back or attempting to reselect to a different PLMN/RAT. In other words, all band, frequency, and cell combinations for a current PLMN/RAT may be attempted prior to attempting to reselect to a new PLMN/RAT.

Figure 7A:
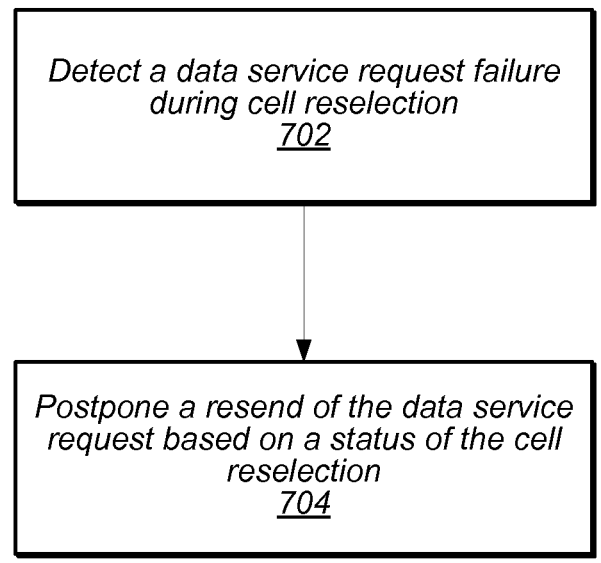
FIG. 7A is a flowchart diagram illustrating a method performed by a UE to postpone a resend of a data service request, according to some embodiments.

FIG. 7A—Flowchart Diagram

FIG. 7A is a flowchart diagram illustrating a method performed by a UE (e.g., UE 016) to postpone a resend of a data service request, according to some embodiments. The method shown in FIG. 7A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a data service request failure during a cell reselection may be detected. In some embodiments, the UE may detect the service request while in idle mode. In addition, the UE may be camped on a first cell (i.e., a serving cell) and cell reselection may include the UE collecting and/or monitoring one or more metrics associated with cell reselection. Alternatively, or in addition, cell reselection may include the UE attempting to camp on a second cell. In some embodiments, the metrics may include one or more of reselection status for each of a plurality of neighboring cells, reselection measurement status (e.g., for inter-frequency, intra-frequency, and inter-RAT reselection), reselection timer status for each of the neighboring cells (e.g., started, failed, passed), a value and/or a time remaining of the reselection timer for each of the neighboring cells, RSRQ status, RSRP status, SINR status for the first (serving) cell and each of the neighboring cells, RACH failure status for the first cell (e.g., the cell the UE is currently camped on), and/or page decode failure status for the first cell.

Note that in some embodiments, the reselection status (e.g., $S_{criteria}$) for the first cell may be compared to a reselection threshold and if the reselection status is below the threshold, the UE may initiate (i.e., begin performing) reselection related measurements on a particular neighboring cell. In addition, if the reselection status is below the reselection threshold for a specified number of times for a contiguous number of idle cycles, reselection to camp on the particular neighboring cell may be performed.

Further, in some embodiments, the reselection timer may be initiated when a particular neighboring cell satisfies one or more cell reselection criteria. Note that if the particular neighboring cell continuously satisfies the reselection criteria for a specified duration of time, the UE may initiate a connection with the particular neighboring cell in order to camp on the particular neighboring cell. Note that in various embodiments that the status may be based at least in part on a comparison of a value (e.g., RSRQ, RSRP, SINR, RACH failure status, and so forth) to an associated threshold.

At 704, a resend of the data service request may be postponed based on a status of the cell reselection. The resend of the data service request may be postponed for a specified time period (i.e., a static delay) or may be postponed until an indication that the cell reselection has been completed (i.e., a variable delay). In some embodiments, a timer may be started and the resend may be performed when the timer expires or is interrupted.

In some embodiments, a number of data service request resends may be tracked and compared to a resend threshold and if the number of resends exceeds the resend threshold, a scan for available neighbor cells may be initiated prior to an attempt to reselect to a different cell. In some embodiments, the scan may be for available LTE neighbor cells and reselection to an available neighboring LTE cell may be attempted prior to initiating a fall back reselection to a lesser (or slower) RAT such as 3G CDMA. In some embodiments the scan may be based on system information blocks (SIBs) or on all bands supported for a particular PLMN. According to some embodiments, if the number of data service request resends exceeds the resends threshold, a specific band, frequency, and/or cell in a PLMN/RAT may be blocked (e.g., removed from a list of available cells) and cell reselection may be repeated for other bands, frequencies, and/or cells within range prior to falling back or attempting to reselect to a different PLMN/RAT. In other words, all band, frequency, and cell combinations for a current PLMN/RAT may be attempted prior to attempting to reselect to a new PLMN/RAT.

Figure 7B:
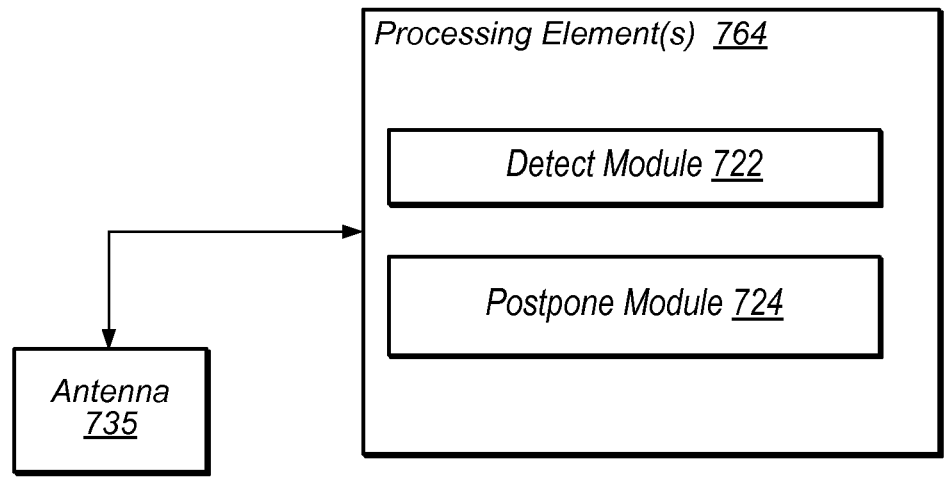
FIG. 7B illustrates a processing element including modules for postponing a resend of a data service request, according to some embodiments.

FIG. 7B illustrates a processing element including modules for processing element including modules for postponing a resend of a data service request, according to some embodiments. In some embodiments, antenna 735 (which may be equivalent to antenna 335 described above) may be coupled to processing element 764 (which may be included in wireless communication circuitry 330 described above). The processing element may be configured to perform the method described above in reference to FIG. 7A. In some embodiments, processing element 764 may include one or more modules, such as modules (or circuitry) 722-724, and the modules (or circuitry) may be configured to perform various steps of the method described above in reference to FIG. 7A. As shown, the modules may be configured as follows.

In some embodiments, processing element 764 may include a detect module 722 (which may be implemented as one or more circuits) configured to detect a data service request failure during a cell reselection. In some embodiments, the service request may be detected while the UE is in an idle mode. In addition, the UE may be camped on a first cell and cell reselection may include collecting and/or monitoring one or more metrics associated with cell reselection. Alternatively, or in addition, cell reselection may include attempting to camp on a second cell. In some embodiments, the metrics may include one or more of reselection status for each of a plurality of neighboring cells, reselection measurement status (e.g., for inter-frequency, intra-frequency, and inter-RAT reselection), reselection timer status for each of the neighboring cells (e.g., started, failed, passed), a value and/or a time remaining of the reselection timer for each of the neighboring cells, RSRQ status, RSRP status, SINR status for each of the neighboring cells, RACH failure status for the first cell (e.g., the cell the UE is currently camped on), and/or page decode failure status for the first cell.

In some embodiments, processing element 764 may include a postpone module 724 (which may be implemented as one or more circuits) configured to postpone a resend of the data service request based on a status of the cell reselection. The resend of the data service request may be postponed for a specified time period (i.e., a static delay) or may be postponed until an indication that the cell reselection has been completed (i.e., a variable delay). In some embodiments, a timer may be started and the resend may be performed when the timer expires.

It is apparent for those skilled in the art that, for the particular processes of the modules (or circuitry) described above (such as modules 722 and 724), reference may be made to the corresponding steps (such as steps 702 and 704, respectively) in the related process embodiment sharing the same concept and the reference is regarded as the disclosure of the related modules (or circuitry) as well. Furthermore, processing element 764 may be implemented in software, hardware or combination thereof. More specifically, processing element 764 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 764 may be implemented as a general-purpose processor such as a CPU, and therefore each module can be implemented with the CPU executing instructions stored in a memory which perform a respective step. In addition, processing element 764 may be implemented as a baseband processor of a radio of a UE.

Figure 8A:
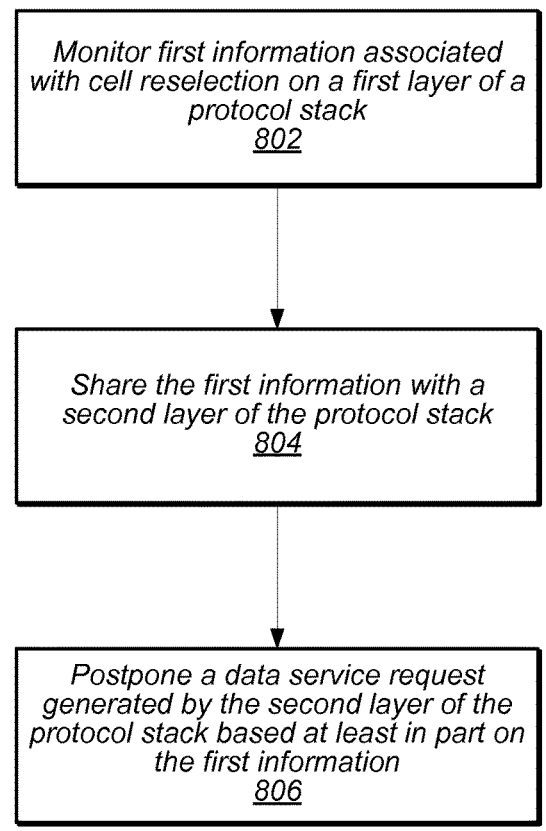
FIG. 8A is a flowchart diagram illustrating a method performed by a UE to postpone a data service request by a second layer of a protocol stack based on first information shared by a first layer of the protocol stack, according to some embodiments.

FIG. 8A—Flowchart Diagram

FIG. 8A is a flowchart diagram illustrating a method performed by a UE (e.g., UE 016) to postpone a data service request by a second layer of a protocol stack based on first information shared by a first layer of the protocol stack, according to some embodiments. The method shown in FIG. 8A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, first information associated with cell reselection may be monitored on a first layer of a protocol stack. In some embodiments, the protocol stack may be implemented on a processing element of a UE (such as UE 106). The processing element may be included in a radio or wireless communication circuitry (e.g. wireless communication circuitry 330). In some embodiments, the processing element may be implemented as, or included in, a baseband processor of the UE. Additionally, the first information may be monitored while the UE is in an idle mode (or state). In addition, the UE may be camped on a first cell.

In some embodiments, the first information may include indications of one or more metrics and/or an indication that an attempt to reselect to a neighboring cell is in process. Note that cell reselection may include both collecting and/or monitoring the one or more metrics associated with cell reselection as well as attempting to camp on a neighboring cell and the UE attempting to camp on a second cell. In some embodiments, the metrics may include one or more of reselection status for each of a plurality of neighboring cells, reselection measurement status (e.g., for inter-frequency, intra-frequency, and inter-RAT reselection), reselection timer status for each of the neighboring cells (e.g., started, failed, passed), a value and/or a time remaining of the reselection timer for each of the neighboring cells, RSRQ status, RSRP status, SINR status for each of the neighboring cells, RACH failure status for the first cell (e.g., the cell the UE is currently camped on), and/or page decode failure status for the first cell.

Further, in some embodiments, the reselection status (e.g., $S_{criteria}$) for a serving cell may be compared to a reselection threshold and if the reselection status is below the threshold, reselection related measurements on a particular neighboring cell may be initiated or performed. In addition, if the reselection status is below the reselection threshold for a specified number of times for a contiguous number of idle cycles, reselection to camp on the particular neighboring cell may be performed.

Further, in some embodiments, the reselection timer may be initiated when a particular neighboring cell satisfies one or more cell reselection criteria. Note that if the particular neighboring cell continuously satisfies the reselection criteria for a specified duration of time, the UE may initiate a connection with the particular neighboring cell in order to camp on the particular neighboring cell. Note that in various embodiments that the status may be based at least in part on a comparison of a value (e.g., RSRQ, RSRP, SINR, RACH failure status, and so forth) to an associated threshold.

At 804, the first information may be shared with a second layer of the protocol stack. The second layer may be a data services layer of the protocol stack. In some embodiments, a third layer, such as a radio resource control (RRC) layer, may receive the first information and send the first information, or an indication of the first information to the second layer.

At 806, a data service request generated by the second layer of the protocol stack may be postponed based at least in part on the first information or an indication of the first information. In some embodiments, the data service request may be postponed for a specified time period (i.e., a static delay) or may be postponed until an indication that the cell reselection has been completed (i.e., a variable delay). In some embodiments, a timer may be started and the resend may be performed when the timer expires or is interrupted. In some embodiments, the data service request may be a reattempt of a prior data service request.

In some embodiments, a number of data service request retries may be tracked and compared to a resend threshold and if the number of retries exceeds the resend threshold, a scan for available neighbor cells may be initiated prior to an attempt to reselect to a different cell. In some embodiments, the scan may be for available LTE neighbor cells and reselection to an available neighboring LTE cell may be attempted prior to initiating a fall back reselection to a lesser (or slower) RAT such as 3G CDMA. In some embodiments the scan may be based on system information blocks (SIBs) or on all bands supported for a particular PLMN. According to some embodiments, if the number of data service request retries exceeds the retries threshold, a specific band, frequency, and/or cell in a PLMN/RAT may be blocked (e.g., removed from a list of available cells) and cell reselection may be repeated for other bands, frequencies, and/or cells within range prior to falling back or attempting to reselect to a different PLMN/RAT. In other words, all band, frequency, and cell combinations for a current PLMN/RAT may be attempted prior to attempting to reselect to a new PLMN/RAT.

Figure 8B:
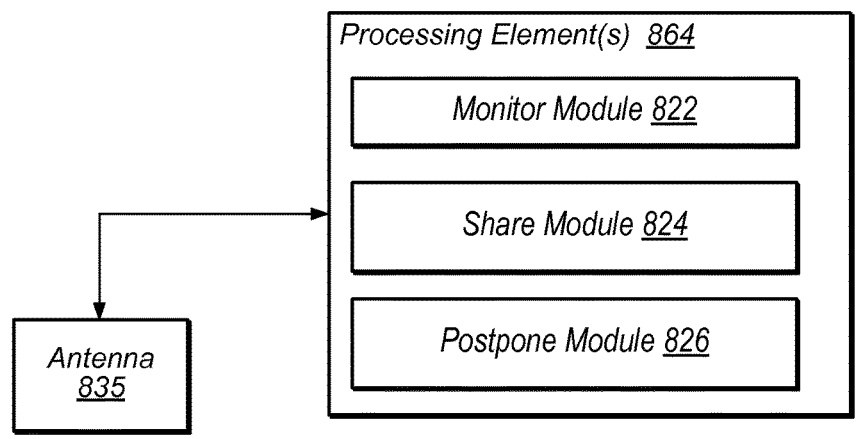
FIG. 8B illustrates a processing element including modules for postponing a data service request by a second layer of a protocol stack based on first information shared by a first layer of the protocol stack, according to some embodiments.

FIG. 8B illustrates a processing element including modules for postponing a data service request by a second layer of a protocol stack based on first information shared by a first layer of the protocol stack, according to some embodiments. In some embodiments, antenna 835 (which may be equivalent to antenna 335 described above) may be coupled to processing element 864 (which may be included in wireless communication circuitry 330 described above). The processing element may be configured to perform the method described above in reference to FIG. 8A. In some embodiments, processing element 864 may include one or more modules, such as modules (or circuitry) 822-826, and the modules (or circuitry) may be configured to perform various steps of the method described above in reference to FIG. 8A. As shown, the modules may be configured as follows.

In some embodiments, processing element 864 may include a monitor module 822 (which may be implemented as one or more circuits) configured to monitor first information associated with cell reselection on a first layer of a protocol stack. Additionally, the first information may be monitored while the UE is in an idle mode (or state). In addition, the UE may be camped on a first cell. In some embodiments, the first information may include indications of one or more metrics and/or an indication that an attempt to reselect to a neighboring cell is in process. Note that cell reselection may include both collecting and/or monitoring the one or more metrics associated with cell reselection as well as attempting to camp on a neighboring cell and the UE attempting to camp on a second cell. In some embodiments, the metrics may include one or more of reselection status for each of a plurality of neighboring cells, reselection measurement status (e.g., for inter-frequency, intra-frequency, and inter-RAT reselection), reselection timer status for each of the neighboring cells (e.g., started, failed, passed), a value and/or a time remaining of the reselection timer for each of the neighboring cells, RSRQ status, RSRP status, SINR status for each of the neighboring cells, RACH failure status for the first cell (e.g., the cell the UE is currently camped on), and/or page decode failure status for the first cell.

In addition, in some embodiments, processing element 864 may include a share module 824 (which may be implemented as one or more circuits) configured to share the first information may be shared with a second layer of the protocol stack. The second layer may be a data services layer of the protocol stack. In some embodiments, a third layer, such as a radio resource control (RRC) layer, may receive the first information and send the first information, or an indication of the first information to the second layer.

Further, in some embodiments, processing element 864 may include a postpone module 826 (which may be implemented as one or more circuits) configured to postpone a data service request generated by the second layer of the protocol stack based at least in part on the first information or an indication of the first information. In some embodiments, the data service request may be postponed for a specified time period (i.e., a static delay) or may be postponed until an indication that the cell reselection has been completed (i.e., a variable delay). In some embodiments, a timer may be started and the resend may be performed when the timer expires or is interrupted. In some embodiments, the data service request may be a reattempt of a prior data service request.

It is apparent for those skilled in the art that, for the particular processes of the modules (or circuitry) described above (such as modules 822, 824, and 826), reference may be made to the corresponding steps (such as steps 802, 804, and 806, respectively) in the related process embodiment sharing the same concept and the reference is regarded as the disclosure of the related modules (or circuitry) as well. Furthermore, processing element 864 may be implemented in software, hardware or combination thereof. More specifically, processing element 864 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 864 may be implemented as a general-purpose processor such as a CPU, and therefore each module can be implemented with the CPU executing instructions stored in a memory which perform a respective step. In addition, processing element 864 may be implemented as a baseband processor of a radio of a UE.

Figure 9A:
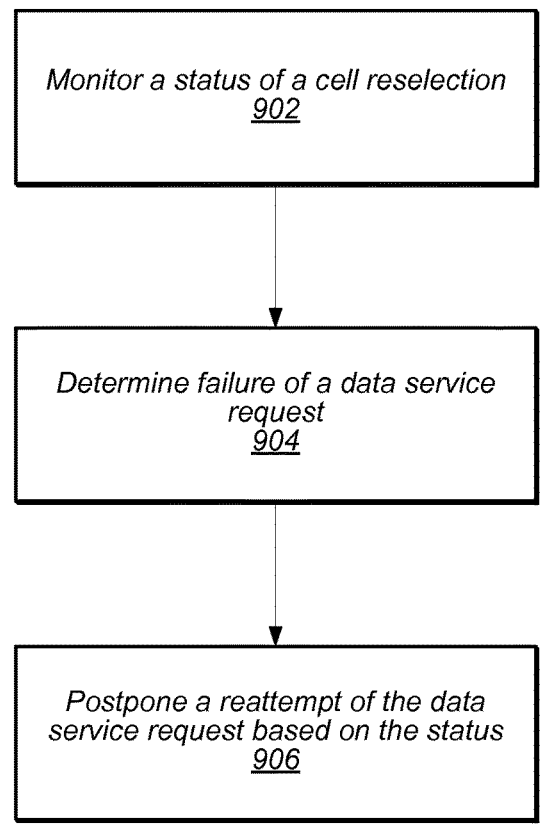
FIG. 9A is a flowchart diagram illustrating a method performed by a UE to postpone a reattempt of a data service request based on a status of a cell reselection, according to some embodiments.

FIG. 9A—Flowchart Diagram

FIG. 9A is a flowchart diagram illustrating a method performed by a UE (e.g., UE 016) to postpone a reattempt of a data service request based on a status of a cell reselection, according to some embodiments. The method shown in FIG. 9A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a status of a cell reselection may be monitored. The status may be monitored while the UE is in an idle mode (or state). In some embodiments, the status may include indications of one or more metrics and/or an indication that an attempt to reselect to a neighboring cell is in process. Note that cell reselection may include both collecting and/or monitoring the one or more metrics associated with cell reselection as well as attempting to camp on a neighboring cell and the UE attempting to camp on a second cell. In some embodiments, the metrics may include one or more of reselection status for each of a plurality of neighboring cells, reselection measurement status (e.g., for inter-frequency, intra-frequency, and inter-RAT reselection), reselection timer status for each of the neighboring cells (e.g., started, failed, passed), a value and/or a time remaining of the reselection timer for each of the neighboring cells, RSRQ status, RSRP status, SINR status for each of the neighboring cells, RACH failure status for the first cell (e.g., the cell the UE is currently camped on), and/or page decode failure status for the first cell.

Further, in some embodiments, the reselection status (e.g., $S_{criteria}$) for a serving cell may be compared to a reselection threshold and if the reselection status is below the threshold, reselection related measurements on a particular neighboring cell may be initiated or performed. In addition, if the reselection status is below the reselection threshold for a specified number of times for a contiguous number of idle cycles, reselection to camp on the particular neighboring cell may be performed.

Further, in some embodiments, the reselection timer may be initiated when a particular neighboring cell satisfies one or more cell reselection criteria. Note that if the particular neighboring cell continuously satisfies the reselection criteria for a specified duration of time, the UE may initiate a connection with the particular neighboring cell in order to camp on the particular neighboring cell. Note that in various embodiments that the status may be based at least in part on a comparison of a value (e.g., RSRQ, RSRP, SINR, RACH failure status, and so forth) to an associated threshold.

At 904, a failure of a data service request may be determined. In some embodiments, the failure may be detected at a radio resource control (RRC) layer of a protocol stack. The failure may be due to poor signal quality and may be an indication of a RACH failure. In some embodiments, a number of failures may be tracked and compared to a failure threshold. In such embodiments, if the number of failures exceeds the failure threshold, a scan for available LTE neighbor cells may be initiated. Additionally, in some embodiments, if the number of failures exceeds the failure threshold, a specific band, frequency, and/or cell may be blocked and cell reselection may be attempted for other bands, frequencies, and/or cells within a PLMN/RAT prior to attempting cell reselection to a different PLMN/RAT.

At 906, a reattempt of the data service request may be postponed based on the status of the cell reselection. In some embodiments, the data service request may be postponed for a specified time period (i.e., a static delay) or may be postponed until an indication that the cell reselection has been completed (i.e., a variable delay). In some embodiments, a timer may be started and the resend may be performed when the timer expires or is interrupted.

Figure 9B:
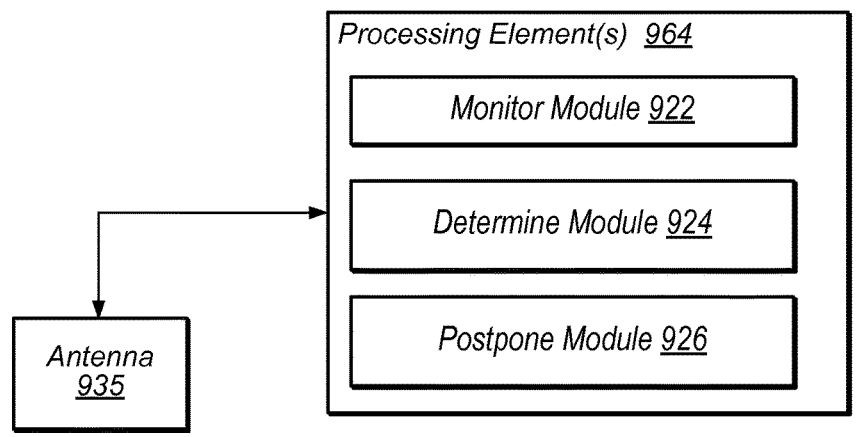
FIG. 9B illustrates a processing element including modules for postponing a reattempt of a data service request based on a status of a cell reselection, according to some embodiments.

FIG. 9B illustrates a processing element including modules for postponing a reattempt of a data service request based on a status of a cell reselection. In some embodiments, antenna 935 (which may be equivalent to antenna 335 described above) may be coupled to processing element 964 (which may be included in wireless communication circuitry 330 described above). The processing element may be configured to perform the method described above in reference to FIG. 9A. In some embodiments, processing element 964 may include one or more modules, such as modules (or circuitry) 922-926, and the modules (or circuitry) may be configured to perform various steps of the method described above in reference to FIG. 9A. As shown, the modules may be configured as follows.

In some embodiments, processing element 964 may include a monitor module 922 (which may be implemented as one or more circuits) configured to monitor a status of a cell reselection. The status may be monitored while the UE is in an idle mode (or state). In some embodiments, the status may include indications of one or more metrics and/or an indication that an attempt to reselect to a neighboring cell is in process. Note that cell reselection may include both collecting and/or monitoring the one or more metrics associated with cell reselection as well as attempting to camp on a neighboring cell and the UE attempting to camp on a second cell. In some embodiments, the metrics may include one or more of reselection status for each of a plurality of neighboring cells, reselection measurement status (e.g., for inter-frequency, intra-frequency, and inter-RAT reselection), reselection timer status for each of the neighboring cells (e.g., started, failed, passed), a value and/or a time remaining of the reselection timer for each of the neighboring cells, RSRQ status, RSRP status, SINR status for each of the neighboring cells, RACH failure status for the first cell (e.g., the cell the UE is currently camped on), and/or page decode failure status for the first cell.

In some embodiments, processing element 964 may include a determine module 924 (which may be implemented as one or more circuits) configured to determine a failure of a data service request. In some embodiments, the failure may be detected at a radio resource control (RRC) layer of a protocol stack. The failure may be due to poor signal quality and may be an indication of a RACH failure. In some embodiments, a number of failures may be tracked and compared to a failure threshold. In such embodiments, if the number of failures exceeds the failure threshold, a scan for available LTE neighbor cells may be initiated. Additionally, in some embodiments, if the number of failures exceeds the failure threshold, a specific band, frequency, and/or cell may be blocked and cell reselection may be attempted for other bands, frequencies, and/or cells within a PLMN/RAT prior to attempting cell reselection to a different PLMN/RAT.

In some embodiments, processing element 964 may include a postpone module 926 (which may be implemented as one or more circuits) configured to postpone a reattempt of the data service request based on the status of the cell reselection. In some embodiments, the data service request may be postponed for a specified time period (i.e., a static delay) or may be postponed until an indication that the cell reselection has been completed (i.e., a variable delay). In some embodiments, a timer may be started and the resend may be performed when the timer expires or is interrupted.

It is apparent for those skilled in the art that, for the particular processes of the modules (or circuitry) described above (such as modules 922, 924, and 926), reference may be made to the corresponding steps (such as steps 902, 904, and 906, respectively) in the related process embodiment sharing the same concept and the reference is regarded as the disclosure of the related modules (or circuitry) as well. Furthermore, processing element 964 may be implemented in software, hardware or combination thereof. More specifically, processing element 964 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 964 may be implemented as a general-purpose processor such as a CPU, and therefore each module can be implemented with the CPU executing instructions stored in a memory which perform a respective step. In addition, processing element 964 may be implemented as a baseband processor of a radio of a UE.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
   at least one antenna for performing wireless communications;
   a radio coupled to the at least one antenna; and
   a processing element coupled to the radio;
   wherein the processing element is configured to cause the UE to:
   detect a data service request failure during cell reselection;
   start a timer upon notification from a lower layer of a protocol stack implemented on the UE; and
   postpone, based on a status of the cell reselection, a resend of the data service request until the timer expires or is interrupted.

2. The UE of claim 1,
   wherein the UE is camped on a first cell, wherein cell reselection comprises the UE attempting to camp on a second cell; and
   wherein the status is an indication that the UE is attempting to camp on the second cell.

3. The UE of claim 1,
   wherein the UE is camped on a first cell, wherein cell reselection comprises the UE monitoring one or more metrics associated with cell reselection; and
   wherein the status is an indication that the UE is monitoring the one or more metrics.

4. The UE of claim 3,
wherein in the one or more metrics comprise at least one of:
   a reselection status for at least one neighboring cell;
   a reselection measurement status;
   a reselection timer status for the at least one neighboring cell;
   a time remaining of the reselection timer for the at least one neighboring cell;
   a reference signal received quality status;
   a received signal received power status;
   a signal to interference and noise ratio status;
   a random access control channel (RACH) failure fail status for the first cell; or
   a page decode failure status for the first cell.

5. The UE of claim 1,
wherein the UE is camped on a first cell, wherein the status is an indication of channel quality.

6. The UE of claim 1,
wherein the processing element is further configured to cause the UE to receive a notification indicating interruption of the timer based on completion of the cell reselection.

7. The UE of claim 1,
wherein the processing element is further configured to cause the UE to:
   receive a notification indicating interruption of the timer from the lower layer.

8. An apparatus, comprising:
a memory; and
a processing element in communication with the memory, wherein the processing element is configured to:
   monitor first information associated with cell reselection on a first layer of a protocol stack;
   share the first information with a second layer of the protocol stack;
   start a timer upon notification from the first layer; and
   postpone, based at least in part on the first information, a data service request generated by the second layer of the protocol stack until the timer expires or is interrupted.

9. The apparatus of claim 8,
wherein the apparatus is comprised in a baseband processor of a user equipment device.

10. The apparatus of claim 8,
wherein the first information comprises an indication of at least one of:
   a status of an attempt to camp on a neighboring cell;
   a reselection status for at least one neighboring cell;
   a reselection measurement status;
   a reselection timer status for the at least one neighboring cell;
   a time remaining of the reselection timer for the at least one neighboring cell;
   a reference signal received quality status;
   a received signal received power status;
   a signal to interference and noise ratio status;
   a random access control channel (RACH) failure fail status for a camped on cell; or
   a page decode failure status for the camped on cell.

11. The apparatus of claim 8,
wherein the processing element is further configured to receive a notification indicating interruption of the timer based on completion of the cell reselection.

12. The apparatus of claim 8,
wherein the first layer is a medium access control layer;
wherein the second layer is a data services layer.

13. The apparatus of claim 8,
wherein the processing element is further configured to receive the first information on a third layer of the protocol stack, wherein the third layer is between the first and second layer; and
wherein to share the first information with the second layer, the processing element is further configured to send an indication of the first information to the third layer from the second layer.

14. The apparatus of claim 8,
wherein the processing element is further configured to:
   receive a notification indicating interruption of the timer from the first layer.

15. A non-transitory computer accessible memory medium comprising program instructions which, when executed at a wireless user equipment (UE) device, cause the UE to:
   monitor a status of a cell reselection;
   determine failure of a data service request; and
   postpone, based on the status, a reattempt of the data service request for a specified period of time, wherein the specified period of time is based on expiration or interruption of a timer initiated upon determination of the failure of the data service request.

16. The non-transitory computer accessible memory medium of claim 15,
wherein the status of the cell reselection comprises an indication of one or more of:
   a status of an attempt to camp on a neighboring cell;
   a reselection status for at least one neighboring cell;
   a reselection measurement status;
   a reselection timer status for the at least one neighboring cell;
   a time remaining of the reselection timer for the at least one neighboring cell;
   a reference signal received quality status;
   a received signal received power status;
   a signal to interference and noise ratio status;
   a random access control channel (RACH) failure fail status for a camped on cell; or
   a page decode failure status for the camped on cell.

17. The non-transitory computer accessible memory medium of claim 15,
wherein to postpone the reattempt of the data service request for the specified period of time, the program instructions are further executable to postpone the data service request until the cell reselection is complete.

18. The non-transitory computer accessible memory medium of claim 15,
wherein the program instructions are further executable to:
   track a number of data service request failures; and
   in response to the number exceeding a threshold, scan for available LTE neighbor cells.

19. The non-transitory computer accessible memory medium of claim 15,
wherein the program instructions are further executable to start the timer.

20. The non-transitory computer accessible memory medium of claim 15, wherein the program instructions are further executable to:
   receive a notification indicating interruption of the timer.

* * * * *